Jan. 14, 1936.  L. SMEDE  2,027,405

TEMPERATURE CONTROL APPARATUS

Filed Sept. 30, 1932   2 Sheets-Sheet 1

WITNESSES:
Leon J. Taza
Hymen Diamond

INVENTOR
Lloyd Smede.
BY
F. W. Lyle
ATTORNEY

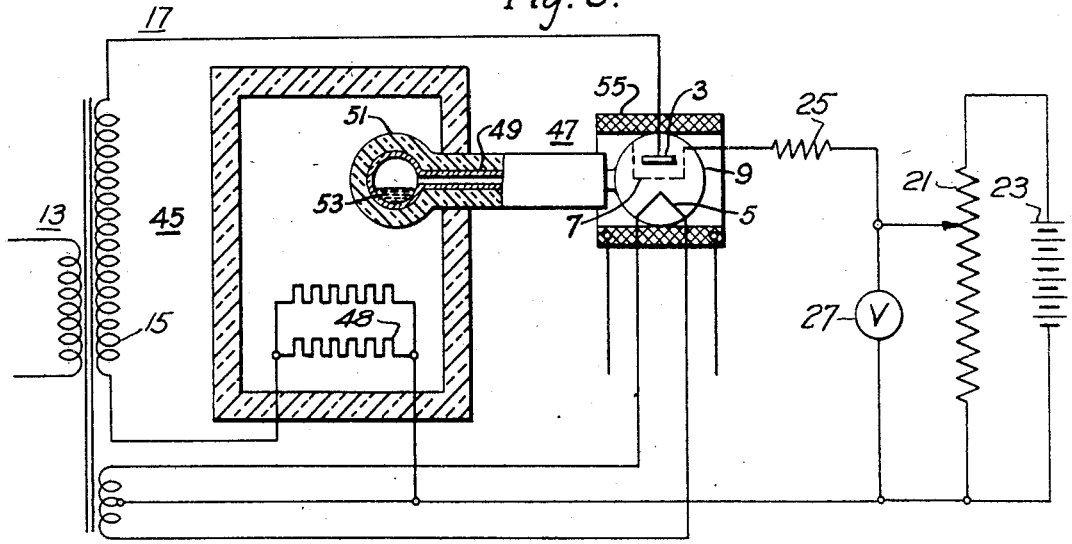
Fig. 6.
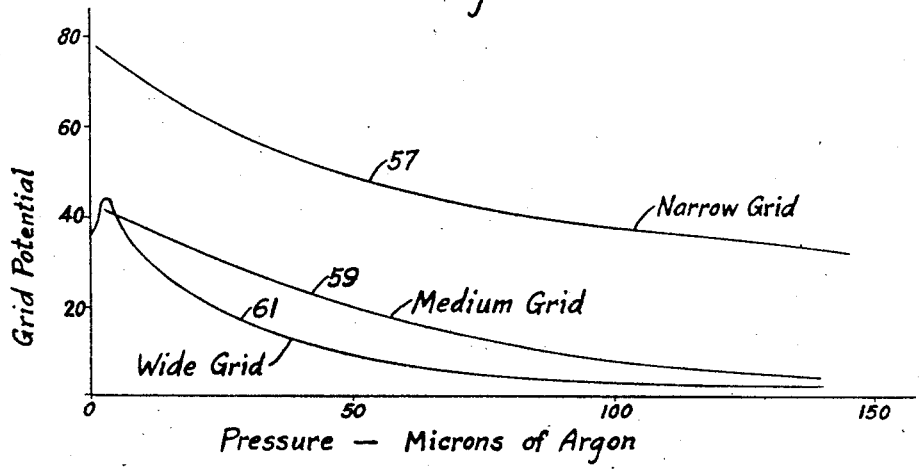
Fig. 7.
Fig. 8.
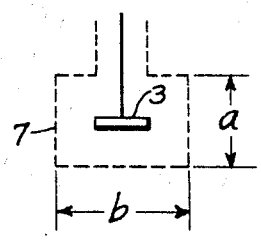
Fig. 9.
| a | b | Grid |
|---|---|---|
| 1/2" | 11/16" | Narrow |
| 13/16" | 1 1/8" | Medium |
| 1 9/16" | 1 15/16" | Wide |
WITNESSES:
Leon J. Taza
Hymen Diamond
INVENTOR
Lloyd Smede.
BY F. W. Lyle
ATTORNEY Patented Jan. 14, 1936

2,027,405

UNITED STATES PATENT OFFICE 2,027,405

TEMPERATURE CONTROL APPARATUS

Lloyd Smede, Pittsburgh, Pa., assignor to Westinghouse Electric & Manufacturing Company, East Pittsburgh, Pa., a corporation of Pennsylvania Application September 30, 1932, Serial No. 635,626

9 Claims. (Cl. 219—20)

My invention relates to temperature control apparatus and it has particular relation to automatic temperature regulating apparatus.

It is an object of my invention to eliminate the use of contacts and their appurtenant elements in temperature control apparatus.

Another object of my invention is to provide temperature responsive apparatus which shall not only indicate temperature variations but shall also transmit power for compensating for the variations when they occur.

A further object of my invention is to provide temperature responsive apparatus of the type that shall not only indicate variations in temperature but shall instantaneously respond to the variations to compensate them.

A more specific object of my invention is to provide control apparatus for maintaining a work system within a predetermined temperature range.

Another specific object of my invention is to provide control apparatus for maintaining the temperature of a work circuit above or below a predetermined point.

An ancillary object of my invention is to provide apparatus for maintaining the pressure of an enclosed system within a predetermined range.

More concisely stated, it is an object of my invention to provide simple and tractable apparatus for not only indicating temperature or pressure variations in a region to be controlled but for instantaneously regulating the temperature or pressure of the region when they vary.

According to my invention, I provide a system incorporating an electric discharge device having a control electrode and a plurality of principal electrodes preferably immersed in a gaseous medium. In the practice of my invention I have found that the electric discharge device that is best adapted to be utilized is one in which the gas is mercury vapor provided by depositing a globule of mercury in the container in which the electrodes are disposed.

The electric discharge device is connected in a circuit of suitable character and potentials are impressed between its electrodes to maintain it either in an energized condition or in a deenergized condition. It is subjected to the influence of the region the temperature of which is to be regulated and assumes substantially the temperature of the region. The vapor in the container is, therefore, at a pressure corresponding to the temperature of the region and the electric discharge device has a characteristic corresponding to the pressure of the vapor.

As the temperature of the region to the influence of which the electric discharge device is subjected is varied, the vapor pressure of the vaporizable material of the electric discharge device is varied and the characteristic of the device is varied. Thus, if the device is in a deenergized condition at a certain temperature and if the temperature is properly varied, the electric discharge device soon attains a condition such that for the potentials impressed between its electrodes it becomes energized. It may be so coupled to a temperature regulator or other suitable apparatus that when this condition is attained the apparatus is actuated to compensate for the variation in temperature of the region.

On the other hand the output of the electric discharge device may be directly fed through the heating coils provided for increasing the temperature of a system and when the device is energized the heating coils take current to increase the temperature of the system. In apparatus of this type the electric discharge device is deenergized as long as the temperature of the system to be controlled is either above the desired temperature or in the neighborhood of the desired temperature. When the temperature of the system falls below the desired value the electric discharge device is energized and the heating coils are energized to increase the temperature of the system. It is well to note that in apparatus of the type described above contact elements are not utilized.

The system described hereinabove may also be utilized for the purpose of indicating the temperature of a region. In such a case the electric discharge device is maintained in a predetermined condition by suitable potentials impressed between its electrodes. It is then subjected to the influence of the region and the potentials applied to its electrodes are so varied that its condition is changed. At the transition point at which it passes from a deenergized condition to an energized condition or from an energized condition to a deenergized condition, the distribution of potential between the electrodes of the electric discharge device is measured. From these potentials and from the character of the electric discharge device the temperature may be determined. In the practice of my invention suitable calibration curves are provided for each electric discharge utilized.

The character of the electric discharge device is, of course, in general, such that it is capable of indicating or responding to temperature variations only over a limited range. The range of response may be varied by changing the character of the vaporizable substance. In general, mercury vapor electric discharge devices are utilized but systems in which the vaporizable substance is any other material such as lead, zinc, tin or bismuth for example, are equivalents which lie within the scope of my invention. By selecting the proper vaporizable substance the range of response may be varied over a wide area and may be extended to a temperature of the order of 2000° C.

Moreover, in accordance with a modification of my invention, therefore, a system is provided for extending the range of response of the electric discharge device. In accordance with this modification the electric discharge device is equipped with an extension, in communication with the portion of the electric discharge device in which the electrodes are immersed, in which a vaporizable substance is disposed. The extension is encased in a heat insulating container of predetermined known character and from the known information concerning the insulator the temperature to which the vaporizable substance is subjected when the extension and its casing are subjected to the influence of a predetermined temperature can be calculated. Or conversely given, the temperature of the vaporizable substance; the temperature to which the casing is subjected can be calculated.

Since the vaporizable substance is in communication with the portion of the electric discharge device in which the electrodes are disposed, the vapor pressure in the electric discharge device is equivalent to the vapor tension of the vaporizable substance and the characteristic of the electric discharge device, therefore, is a criterion of the temperature of the vaporizable substance, and, therefore, of the region in which the extension is disposed.

It is apparent, of course, that if the vaporizable substance is of a character such that the response of the electric discharge device covers the range of temperatures to be controlled, the above described embodiment need not be utilized and the device itself may be disposed in the region the temperature of which is to be measured or controlled.

In accordance with a further modification of my invention, the principles discussed hereinabove may be utilized for the purpose of indicating pressure and compensating for pressure variations. However, in the latter application the internal atmosphere of the electric discharge device must be in communication with the region, the pressure of which is to be measured, while in the former application, no such communication is necessary.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which:

Fig. 6 is a view partly diagrammatic and partly in section showing a further modification of my invention;

Fig. 7 is a graph showing the pressure characteristic of an electric discharge device utilized in the practice of my invention.

Fig. 8 is a diagram utilized to illustrate certain features of the graph; and,

Fig. 9 is a chart corresponding to Fig. 8.

Figure 1:
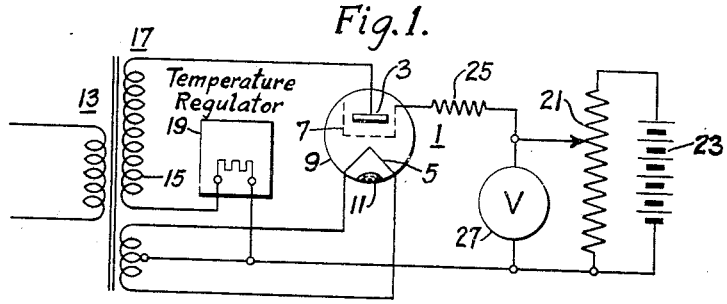
Figure 1 is a diagrammatic view showing a temperature control system constructed in accordance with my invention.

The apparatus shown in Fig. 1 comprises an electric discharge device 1 of the gas-filled type having an anode 3, a cathode 5 and a control electrode 7 all immersed in a gaseous envelope 9. In a system of the type shown in Fig. 1, the control electrode 7 is a screen of comparatively small mesh and encloses the anode 3. The gaseous atmosphere in the container 9 is provided by the partial vaporization of a globule 11 of mercury deposited within the container 9.

Power is supplied to the electric discharge device through a transformer 13, a section 15 of the secondary 17 of which is connected between the anode 3 and the cathode 5 through a temperature regulator 19 of any desired character. The control electrode 7, on the other hand, is supplied with potential from a potentiometer 21 energized from a suitable power supply source 23 through a resistor 25 of suitable character. A voltmeter 27 is connected between the control electrode 7 and the cathode 5 of the device 1 and indicates the potential applied to the control electrode.

In the practice of my invention, the electric discharge device is subjected to the influence of the region, the temperature of which is to be regulated. Preferably, the potentials applied between the electrodes of the device are such that normally the device is in a deenergized condition. However, as the temperature of the region is varied the temperature of the device is varied and the temperature, and therefore the vapor pressure, of the vaporizable substance is varied. The constants of the electric discharge device may be such that for a temperature variation of the desired magnitude the device is energized. The temperature regulator 19 in the system then operates to compensate for the temperature variation.

Figure 2:
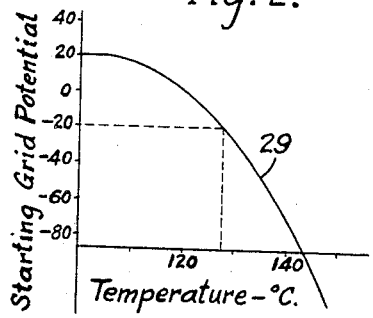
Fig. 2 is a graph showing the characteristic of a system such as is shown in Fig. 1.

In Fig. 2, a calibration curve 29 corresponding to a system of the type shown in Fig. 1 is illustrated. In this view, the starting grid potential measured by the voltmeter 27 connected between the control electrode 7 and the cathode 5 is plotted as ordinate while the temperature in degrees centigrade corresponding to the potentials is plotted as abscissa.

The curve 29 corresponds to a system in which the control electrode 7 of the electric discharge device 1 has a mesh of .625 millimeter; an electromotive force of 440 volts (R. M. S.) is applied between the cathode 5 and the anode 3 of the electric discharge device 1 while the resistor 25 is of the order of 3000 ohms.

I have found that a system of the type to which Fig. 2 corresponds regulates temperature in the range extending from 130° C. upward rather satisfactorily. As is apparent from a consideration of the graph, and of the apparatus, the system may be utilized not only for the purpose of regulating temperature but also for the purpose of measuring temperature. If it should be desirable to measure the temperature of the region to the influence of which the electric discharge device 1 is subjected, the potential applied to the control electrode 7 of the electric discharge device should be first so adjusted that the electric discharge device is in deenergized condition. After the electric discharge device 1 has attained the temperature of the region the potential applied to the control electrode 7 should be varied until the electric discharge device just becomes energized. This situation will occur at a predetermined potential, depending on the temperature, and the temperature corresponding to the potential may be determined from the calibration curve 29 shown in Fig. 2. Thus, if the electric discharge device 1 becomes energized at —20 volts grid potential, the temperature of the region is of the order of 128° C.

If it should be desirable to so regulate the temperature of a region that it should remain below a predetermined point, the potential applied to the control electrode 7 may be adjusted to a value that is just below the value of potential at which the electric discharge device 1 becomes energized at the temperature in question. The value of potential may, of course, be determined from a calibration curve 29 of the type shown in Fig. 2. Thus, if it is desirable that the electric discharge device be maintained at a temperature of approximately 128° C. the potential applied to the control electrode may be adjusted to a value of —20 and a small fraction volts. The electric discharge device 1 will thus be normally deenergized as long as the temperature of the region is smaller than 128° C. However, as soon as the temperature of the region attains 128° C. the electric discharge device 1 is immediately energized and the temperature regulator 19 is actuated to properly change the temperature.

On the other hand, if it should be desirable to maintain the temperature of a region just above a predetermined value, the electric discharge device may be normally maintained in an energized condition with the control potential at a value just above the potential corresponding to the temperature in question. If this temperature is again 128° C. the electric discharge device may be maintained energized by applying to the control electrode 7 a potential that is a small fraction greater than —20 volts. If in such a case the temperature falls below 128° C. the electric discharge device 1 is immediately deenergized and the temperature regulator may again be actuated to provide the necessary compensation.

It is well to point out here that electric discharge devices utilized in the preferred practice of my invention are of the type that lock themselves in, that is to say, as soon as the potential of the control electrode 7 attains a proper value the electric discharge device 1 becomes energized and remains in energized condition as long as the principal potential does not fall below the value required to maintain an arc between the principal electrodes 3 and 5, regardless of the variations in the value of the control potential. In the present case the electric discharge device 1 is energized from an alternating current power source and is therefore periodically deenergized and maintained responsive to the changes in the condition of the electric discharge device and in the control potential. The electric discharge device should, of course, be deenergized with a periodicity that is high compared to the normal rate of variation in temperature in the region.

It is apparent that two systems of the type shown in Fig. 1, one with potentials adjusted so that the electric discharge device 1 is just energized at a predetermined temperature, and the other with the potentials so adjusted that the electric discharge device is just deenergized at the temperature, may be utilized to maintain the temperature of a region at a predetermined point.

Figure 3:
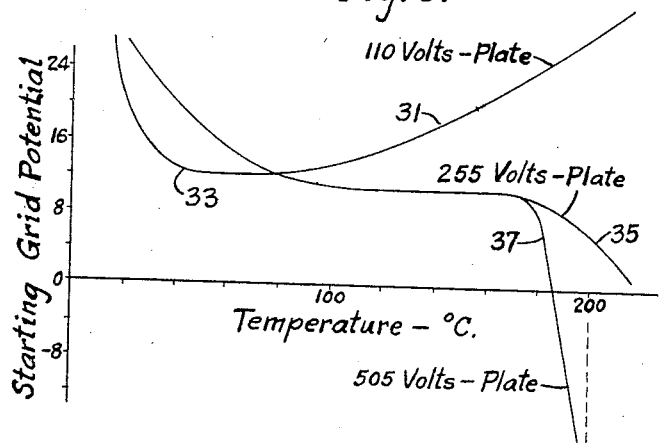
Fig. 3 is another graph showing the characteristic of a system such as is shown in Fig. 1.

In Fig. 3 calibration curves are shown for systems of the type illustrated in Fig. 1 in which different potentials are applied between the principal electrodes 3 and 5 of the electric discharge device 1. The upper curve 31 corresponds to a principal potential of 110 volts. It is to be noted that this curve will be intersected at two points by a straight line drawn parallel to the axis of abscissa. In other words, there are two temperatures, one below approximately 50° and the other above approximately 50° that correspond to any value of grid potential. A system corresponding to this curve can be utilized if it is known that the temperature of a region will be maintained within a predetermined range on one side of the stationary point 33 of the curve 31.

It is to be noted that if the apparatus is operated in the rising region of the curve 31, the operation of the discharge device 1 is inverse to its operation as represented by the curve 29 of Fig. 2. Assume for example that the region to be controlled is to be maintained at 140° C. In such a case the plate potential of the discharge device is maintained at 110 volts and the grid potential is just below 17 volts. The discharge device 1 is therefore manually deenergized. If the temperature of the region decreases below 140° C., the discharge device is energized and the necessary heating current for the region may be supplied through it. In such a case mechanical elements need not be utilized in controlling the temperature of the region.

The other two curves 35 and 37 shown in this view correspond to principal potentials of 255 volts and 505 volts, respectively. Particular attention is called to the 505 volt curve 37 which drops off rather abruptly beyond approximately 172°. A system corresponding to the curve 37 may be utilized to considerable advantage to maintain the temperature of a region at some temperature greater than 172°. In such a case the system shown in Fig. 1 would be operated at some point along the steep portion of the curve 37. Since along the steep portion of the curve 37 the situation is such that a slight change in temperature corresponds to a comparatively large change in grid potential, a regulator of the type shown in Fig. 1 and operated at a point along the steep portion of the curve shown in Fig. 3 is highly sensitive.

Correspondingly, it is to be noted that the same curve 37 and also the curve 35 are comparatively steep in the region of the origin. If it should be desirable to maintain the temperature of a region at a temperature, for example, of the order of 20°, this portion of either of the curves 35 or 37 may be utilized for this purpose.

Figure 4:
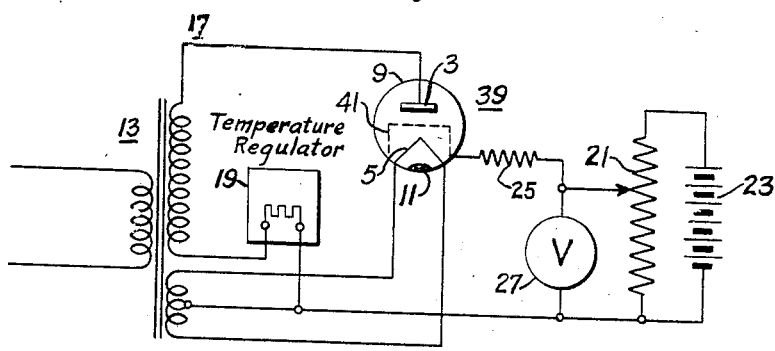
Fig. 4 is a diagrammatic view showing a modification of my invention.
Figure 5:
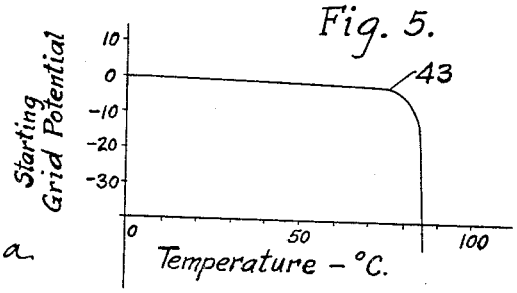
Fig. 5 is a graph corresponding to Fig. 4.

The system of the type shown in Fig. 4 is largely similar to the system shown in Fig. 1. It is to be noted, however, that the electric discharge device 39 in this system incorporates a control electrode 41 of comparatively large mesh which surrounds the cathode 5. A calibration curve 43 corresponding to a system of the type shown in Fig. 4 in which the principal potential is of the order of 440 volts (R. M. S.) and the mesh of the control electrode is approximately 128 mm. is shown in Fig. 5. It is seen from this view that beyond approximately 85° the electric discharge device 39 is not subjected to the control of the control electrode 7. The system of the type to which Fig. 5 corresponds can be utilized with considerable success to maintain a region at a temperature below approximately 85° or more specifically below the temperature corresponding to the point at which the calibration curve 43 falls off steeply.

Apparatus of the type shown in Fig. 6 may be utilized with advantage in systems wherein the temperature of the region to be measured or regulated is in a range above that at which the electric discharge device 1 or 39 is capable of responding.

The system shown in this view comprises a resistance furnace 45, the temperature of which is to be compensated. The electric discharge device 47 utilized for controlling the compensator is equipped with an extension 49 which is in communication with the envelope 9 in which the electrodes 3, 5 and 7 are disposed. The electrodes are of course connected in the usual indicating compensating circuit of the type shown in Fig. 1.

The extension 49 of the electric discharge device 47 is enclosed within an insulating casing 51 of predetermined thickness and has disposed therein a vaporizable substance 53 such as mercury. Since the thickness of the casing 51 surrounding the extension is known, the drop in temperature between the atmosphere of the furnace 45 and the vaporizable substance 53 may be determined. The temperature of the vapor of the vaporizable substance 53 may, therefore, be determined as a function of the temperature of the furnace 45 and of the time period over which the casing was heated.

The portion of the electric discharge device 47 in which the electrodes are disposed is encased within a heating coil 55 and is thereby maintained at a temperature above the expected highest temperature of the vaporizable substance 53. The pressure in this portion of the electric discharge device 47 will, therefore, be substantially equal to the vapor tension of the vaporizable substance 53. Since the temperature of the vapor may be determined from the characteristic of the response of the electric discharge device 47, and since the temperature of the furnace 45 is known as a function of this temperature, the temperature of the furnace may be either determined or compensated by the electric discharge device 47 shown in this view. As previously explained the output of the electric discharge device may be directly fed through the heating coils 48.

It is to be noted that in the above-described embodiment of my invention a temperature gradient was established to extend the range of the system. However, in the system as it is shown the temperature gradient is a function of the time period during which the insulating casing is disposed in the furnace and for this reason for accurately regulating or determining the temperature of the furnace the time must be taken into consideration. My invention may also be practiced in such manner that the time element need not be considered. In a system in which the time element is not considered the electric discharge device is imbedded at a predetermined point in a bar having predetermined thermal characteristics. One end of the bar is maintained at the temperature of the furnace while the other end is permanently maintained at some predetermined temperature. The bar may also be suitably insulated to repress the vitiating influences of the surrounding region. Since one end of the bar is at the furnace temperature while the other end is at another temperature, a temperature gradient exists along the bar and the temperature of the region when the electric discharge device is disposed is known as a function of the temperature of the furnace.

Figs. 7, 8 and 9 illustrate the operation of a system which can, in accordance with my invention, be utilized for the purpose of determining pressure. In such a system the electric discharge device 1 or 39 is connected in a circuit such as is shown in Fig. 1 or 4 for example and the system of which the pressure is to be measured is put into communication with the atmosphere of the electric discharge device in such manner that the pressure of the device is at least a function of the pressure of the system.

In Fig. 7, the pressure calibration curves 57, 59 and 61 for three different types of grids are plotted. The control potential is here plotted as a function of the pressure of the vapor within the electric discharge device.

The electric discharge device to which the curves 57, 59 and 61 correspond is of the type shown in Fig. 1. The principal potential applied is of the order of 550 volts and the mesh of the control electrode is of the order of .625 millimeter. The three curves correspond to grid structures defined by Figs. 8 and 9. As can be seen from these views the upper curve 57 corresponds to a narrow grid of which the height is ½ inch and the length is $1\frac{1}{4}$ inch. The middle curve 59 corresponds to a medium grid of which the height is $\frac{13}{16}$ of an inch, and the length is $1\frac{1}{8}$ inches while the lower curve 61 corresponds to a wide grid of which the height is $1\frac{3}{16}$ inches and the length is $1\frac{1}{8}$ inches.

The pressure of a region may be determined by utilizing a system of the type shown in Fig. 1 and the calibration curves shown in Fig. 7. The region is simply put into communication with the electric discharge device and the pressure is determined from the control potentials by reading the calibration curves 57, 59 or 61.

In the above-described embodiments of my invention electric discharge devices incorporating hot cathodes are utilized. My invention may also be practiced with systems incorporating electric discharge devices of other types such as cold cathode electric discharge devices and mercury pool devices both of the make-alive and keep-alive type.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. Temperature responsive apparatus comprising an evacuated container, a plurality of principal electrodes in said container, a control electrode to cooperate with said principal electrodes, a second evacuated container in communication with said first container, a vaporizable substance disposed within said last-named container, a thermal insulating medium of predetermined character enclosing said last-named container and means for maintaining said first-named container at a predetermined temperature.

2. Temperature responsive apparatus comprising an evacuated container, a plurality of principal electrodes in said container, a control electrode to cooperate with said principal electrodes, a second evacuated container in communication with said first container, a vaporizable substance disposed within said last-named container, and means for maintaining said first-named container at a predetermined temperature.

3. Temperature responsive apparatus comprising an evacuated container designed to be located within the influence of the region to be controlled, a plurality of principal electrodes in said container, a control electrode to cooperate with said principal electrodes, a vaporizable substance disposed in said container, a circuit incorporating said principal electrodes, temperature regulating means in said principal electrodes circuit, said control electrode being at a predetermined potential.

4. Temperature responsive apparatus comprising an evacuated container designed to be located within the influence of the region to be controlled, a plurality of principal electrodes in said container, a control electrode to cooperate with said principal electrodes, a vaporizable substance disposed in said container, a circuit incorporating said principal electrodes, temperature regulating means comprising a heating unit directly connected in said principal electrodes circuit, said control electrode being at a predetermined potential.

5. Temperature responsive apparatus comprising an evacuated container designed to be located within the influence of the region to be controlled, a plurality of principal electrodes in said container, a control electrode to cooperate with said principal electrodes, a vaporizable substance disposed in said container, a circuit incorporating said principal electrodes, a heating coil in said principal electrodes circuit and adapted to be heated by the current in said circuit, said control electrode being at a predetermined potential.

6. Temperature responsive apparatus comprising an evacuated container designed to be located within the influence of the region to be controlled, a plurality of principal electrodes in said container, a control electrode to cooperate with said principal electrodes, a vaporizable substance comprising mercury disposed in said container, a circuit incorporating said principal electrodes, temperature regulating means in said principal electrodes circuit, said control electrode being at a predetermined potential.

7. Temperature responsive apparatus comprising a gas-tight container designed to be disposed within the influence of a region the temperature of which is to be controlled, a plurality of principal electrodes in said container, a control electrode to cooperate with said principal electrodes, a vaporizable substance disposed in said container, a circuit incorporating said principal electrodes, means for increasing the temperature of said region in response to current transmitted therethrough, connected in the circuit of said principal electrodes, and means for maintaining said control electrode at a predetermined potential.

8. Temperature responsive apparatus comprising a gas-tight container designed to be subjected to the influence of a region the temperature of which is to be controlled, a plurality of principal electrodes in said container, a control electrode to cooperate with said principal electrodes, a vaporizable substance disposed within said container, means for impressing a potential between said principal electrodes, the relationship between the structures of said electrodes, said substance and the magnitude of the last said potential being such that at the desired temperature of said region the minimum control potential for which a discharge is initiated between said principal electrodes increases as the temperature of said region increases, means for increasing the temperature of said region in response to current transmitted therethrough, connected to be supplied with the current transmitted between said principal electrodes when a discharge is initiated therebetween and means for maintaining said control electrode at a predetermined potential such that said discharge is initiated only when the temperature of said region falls below a predetermined value.

9. Temperature responsive apparatus comprising a gas-tight container designed to be subjected to the influence of a region the temperature of which is to be controlled, a plurality of principal electrodes in said container, a control electrode to cooperate with said principal electrodes, a substance within said container, said substance being of such character that at a given principal potential the minimum control potential for which a discharge is initiated between the principal electrodes is a function of the temperature of the container, means for impressing a potential between said principal electrodes, the relationship between the structures of said electrodes, said substance and the magnitude of the last said potential being such that at the desired temperature of said region the minimum control potential for which a discharge is initiated between said principal electrodes increases as the temperature of said region increases, means for increasing the temperature of said region in response to current transmitted therethrough, connected to be supplied with the current transmitted between said principal electrodes when a discharge is initiated therebetween and means for maintaining said control electrode at a predetermined potential such that said discharge is initiated only when the temperature of said region falls below a predetermined value.

LLOYD SMEDE.